US010671505B2

(12) United States Patent
Kim et al.

(10) Patent No.: US 10,671,505 B2
(45) Date of Patent: Jun. 2, 2020

(54) SYSTEM AND METHOD FOR MONITORING SERVICE

(71) Applicant: SAMSUNG SDS CO., LTD., Seoul (KR)

(72) Inventors: Jae-Jin Kim, Seoul (KR); Woo-Jin Park, Seoul (KR); Ku-Young Jung, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 471 days.

(21) Appl. No.: 15/491,003

(22) Filed: Apr. 19, 2017

(65) Prior Publication Data

US 2017/0302541 A1    Oct. 19, 2017

(30) Foreign Application Priority Data

Apr. 19, 2016    (KR) .................. 10-2016-0047547

(51) Int. Cl.
| | |
|---|---|
| *G06F 15/173* | (2006.01) |
| *G06F 11/34* | (2006.01) |
| *H04L 12/24* | (2006.01) |
| *H04L 29/08* | (2006.01) |

(52) U.S. Cl.
CPC ...... *G06F 11/3409* (2013.01); *H04L 41/5009* (2013.01); *H04L 67/1002* (2013.01)

(58) Field of Classification Search
CPC ......... H04L 47/10; H04L 47/41; H04L 47/70; H04L 47/125; H04L 47/193; H04L 45/60; H04L 45/28; H04L 45/245; H04L 45/54; H04L 45/72; H04L 45/38; H04L 45/302; H04L 45/125; H04L 67/10; H04L 67/1008; H04L 67/1038; H04L 67/2814; H04L 67/2895
USPC .......................... 709/203, 224, 226, 232, 238
See application file for complete search history.

(56) References Cited

U.S. PATENT DOCUMENTS

| | | | | |
|---|---|---|---|---|
| 2013/0212296 | A1* | 8/2013 | Goel | H04L 45/7453 709/238 |
| 2013/0336329 | A1* | 12/2013 | Gopinath | H04L 45/24 370/401 |
| 2016/0149820 | A1* | 5/2016 | McGhee | H04L 47/32 370/230 |
| 2016/0164683 | A1* | 6/2016 | Barney | G06F 21/78 713/189 |

* cited by examiner

*Primary Examiner* — Farzana B Huq
(74) *Attorney, Agent, or Firm* — Sughrue Mion, PLLC

(57) ABSTRACT

A service monitoring system and method are provided. The service monitoring system includes a service apparatus configured to: convert text information corresponding to a functional block from among one or more functional blocks of a target service into a first abbreviated key, add the first abbreviated key and the text information to a first table, convert call flow information into a second abbreviated key, the call flow information indicating an order in which the one or more functional blocks are called when the target service is executed, and add the second abbreviated key and the call flow information to a second table; and a monitoring server configured to receive the first table and the second table from the service apparatus, and to acquire profiling information regarding the functional block using the first table and the second table.

16 Claims, 10 Drawing Sheets

FIG.3

| KEY | VALUE |
|---|---|
| d84U12Dlkj | com.sds.sdsservice.dapi.common.dynamodb.DynamoDBController.selectRecords |
| Bk3zr980vD | com.sds.sdsservice.dapi.common.controller.BaseController.logResponseBody |
| Nb61kiF2Fk | com.sds.sdsservice.dapi.common.storage.DynamoDBDocumentStorage.getInitTimesta mp |
| b93LDIFOjh | select a.appid,a.sid, a.cid,@v_usg_usr_cnt:=(select concat(sum(usg),',',count(distinct(b.uid))) from sdsservice_qta.TCQU_USR_USG b where a.appid = b.appid and a.sid = b.sid and a.cid = b.cid and b.uid NOT IN 0 usg_usr_cnt ,ifnull(left(@v_usg_usr_cnt,instr(@v_usg_usr_cnt,',')-1),0) as usg ,ifnull(substr(@v_usg_usr_cnt,instr(@v_usg_usr_cnt,',')+1,0) as usr_cnt from sdsservice_qta.TCCO_CLD_APP a where 1 = 1 and ((appid = 'tj9u972o46' and sid = 'yYA388mhN' and cid = 'KNszpw4113') or (appid = 'tj9u972o46' and sid = 'yYA388mhN' and cid = 'ns9bN4wyJe') or (appid = 'tj9u972o46' and sid = 'yYA388mhN' and cid = 'QwgaqQstu')); |
| Qlka3loD3O | SELECT CASE WHEN (((@USG - @EXPR) > (CAST(SUBSTR(A.FREE_QT_ID, 6, 3) AS UNSIGNED))*1024*1024*1024) THEN OVERFLOW ELSE NORMAL' END LEVEL FROM TCQU_USR_QT A WHERE A.UID = ''; |
| 0Ekz4lHJfl | SELECT UID, APPID, SID, CID, MDS_DID, IFNULL(SUM(EPR_USG), 0) EPR_USG, @NOW_DT NOW_DT, @TABLE_ID TABLE_ID FROM TCQU_USR_USG_EPR WHERE EPR_DT < @NOW_DT GROUP BY UID, APPID, SID, CID, MDS_DID; |

FIG.4

| KEY | VALUE |
|---|---|
| klf2 | zr98ONb6jKCR314hjjiGDudr4xGFj8wrey9yoG3jG4ig7hiSFDjGfGivGdFfhjrf3cO1G4hyjKjfAsdfd84jU12DikjBk3jkjfASdfd84jU12DikjBk3jff3cD1G4hyjkjfASdfd84jU12DikjBk3jkjfASdfd84jU12DikjBk3j |
| U2kn | 1KF2Fkb93jiGDudr4xGFj2yt8zqf8Fj uFgAGUvuiFj4Gg39p7h97jG4ig7hiSFDjGfGivGdFfhj8wrey9yoG3jG4ig7hiSFDjGfGivGdFfhj |
| sdfk | LDIFDjhQjkj4Gg39p7h97j8wrey9yoG3jG4ig7hiSFDjGfGivGdFfhj8wrey9yoG3jG4ig7hiSFDjGfGivGdFfhj |
| 298u | uA3re4fihbjjKCR314hjjiGDudr4xGFj4Gg39p7h97jGfGivGdFfhjnFjKLGvbxFjGivGdFfhjnFjKLGvbxFjGfGivGdFfhjnFjKLGvbxFj |
| ALKh | jKCR314hjjiGDudr4xGFj2yt8zqf8FjuFgAGUvuiFj4Gg39p7h97juFgAGUvuiFj4Gg39p7h97jU12DikjBk3j |
| hkZs | rf3cO1G4hyjkjfASdfd84jU12DikjBk3jkjfASdfd84jU12DikjBk3jiGDudr4xGFj2yt8zqf8FjuFgAGUvuiFj4Gg39p7h97jyoG3jG4ig7hiSFDjGfGivGdFfhjnFjKLGvbxFjsGrhiFguG8j |

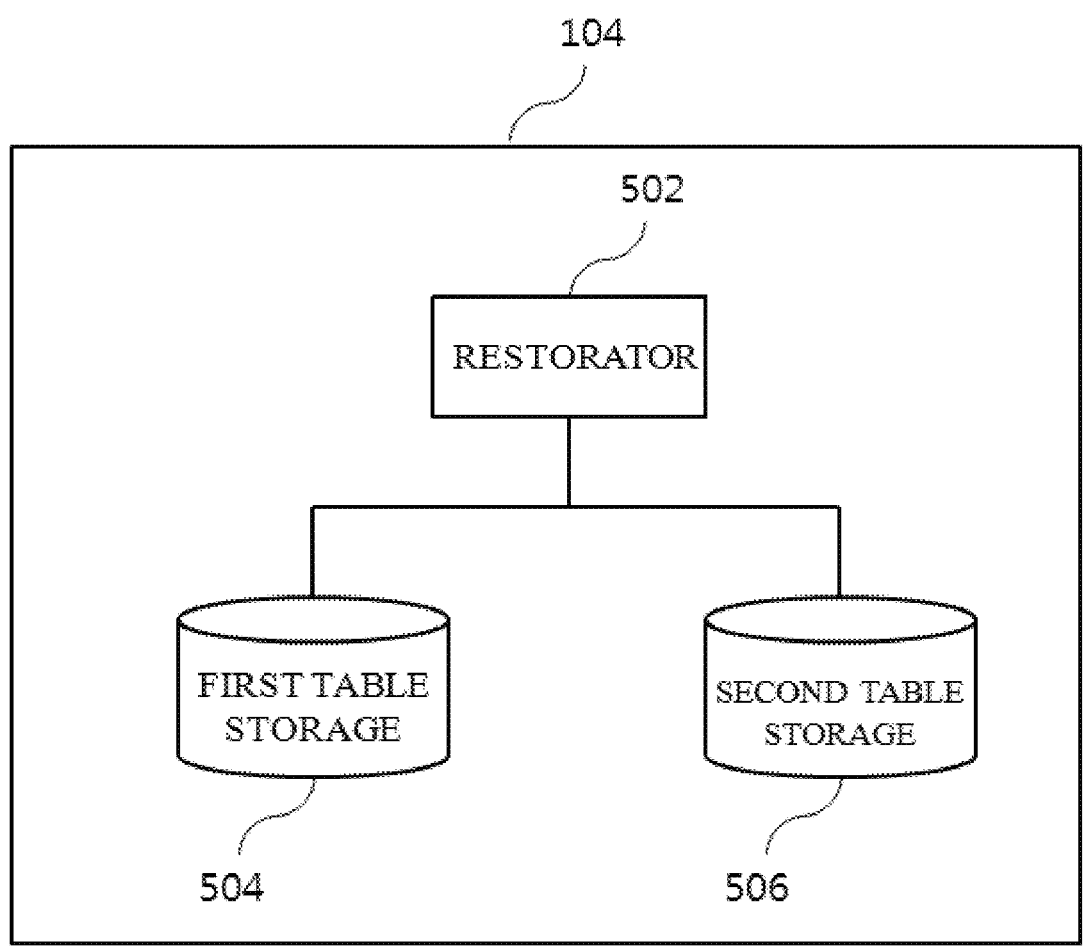

FIG. 6

| TEXT INFORMATION | PERFORMANCE MEASUREMENT RESULT VALUE |
|---|---|
| com.sds.sdsservice.dapi.common.dynamodb.DynamoDBController.selectRecords | 10ms |
| com.sds.sdsservice.dapi.common.storage.DynamoDBDocumentStorage.getInitTimestamp | 23ms |
| select a.appid,a.sid ,a.cid ,@v_usg_user_cnt:=(select concat(sum(usg),':',count(distinct(b.uid))) from sdsservice_qta.TCQU_USR_USG b where a.appid = b.appid and a.sid = b.sid and a.cid = b.cid and b.uid NOT IN 0 usg_usr_cnt , ifnull(left(@v_usg_user_cnt,instr(@v_usg_user_cnt,':')-1),0) as usg , ifnull(substr(@v_usg_user_cnt,instr(@v_usg_user_cnt,':')+1),0) as usr_cnt from sdsservice_qta.TCCO_CLD_APP | 20ms |
| com.sds.sdsservice.dapi.common.controller.BaseController.logResponseBody | 27ms |
| SELECT CASE WHEN ((@USG - @EXPR) > (CAST(SUBSTR(A.FREE_QT_ID, 6, 3) AS UNSIGNED))*1024*1024*1024) THEN 'OVERFLOW' ELSE 'NORMAL' END LEVEL FROM TCQU_USR_QT A WHERE A.UID = '' | 10,710ms |
| SELECT UID, APPID, SID, CID, MDS_DID, IFNULL(SUM(EPR_USG), 0) EPR_USG, @NOW_DT NOW_DT, @TABLE_ID TABLE_ID FROM TCQU_USR_USG_EPR WHERE EPR_DT < @NOW_DT GROUP BY UID, APPID, SID, CID, MDS_DID; | 30ms |

FIG.7

| ORDER | ACTION | MONITORING |
|---|---|---|
| 1 | EXECUTE USER ID MATCH CHECKING METHOD | |
| 2 | EXECUTE USER ID DUPLICATION QUERY SQL | O |
| 3 | EXECUTE PASSWORD MATCH INSPECTION (SPECIAL CHARACTERS, NUMBERS, SAME CHARACTERS, ETC.) METHOD | |
| 4 | EXECUTE BLACK LIST CONFIRMATION METHOD | |
| 5 | EXECUTE BLACK LIST CONFIRMATION QUERY SQL | O |
| 6 | EXECUTE REAL-NAME AUTHENTICATION METHOD | |
| 7 | EXECUTE ACCESS TOKEN GENERATION METHOD | |
| 8 | EXECUTE MEMBER INFORMATION STORAGE METHOD | |
| 9 | EXECUTE MEMBER INFORMATION INSERTION SQL | O |
| 10 | EXECUTE EMAIL TRANSMISSION METHOD | |
| 11 | EXECUTE SMPT METHOD | |
| 12 | EXECUTE INFORMATION RETURN METHOD WHEN MEMBER SUBSCRIPTION SUCCEEDS | |

FIG.8

| ORDER | ACTION | MONITORING |
|---|---|---|
| 1 | EXECUTE USER ID MATCH CHECKING METHOD | O |
| 2 | EXECUTE USER ID DUPLICATION QUERY SQL | O |
| 3 | EXECUTE PASSWORD MATCH INSPECTION (SPECIAL CHARACTERS, NUMBERS, SAME CHARACTERS, ETC.) METHOD | O |
| 4 | EXECUTE BLACK LIST CONFIRMATION METHOD | O |
| 5 | EXECUTE BLACK LIST CONFIRMATION QUERY SQL | O |
| 6 | EXECUTE REAL-NAME AUTHENTICATION METHOD | O |
| 7 | EXECUTE ACCESS TOKEN GENERATION METHOD | O |
| 8 | EXECUTE MEMBER INFORMATION STORAGE METHOD | O |
| 9 | EXECUTE MEMBER INFORMATION INSERTION SQL | O |
| 10 | EXECUTE EMAIL TRANSMISSION METHOD | O |
| 11 | EXECUTE SMPT METHOD | O |
| 12 | EXECUTE INFORMATION RETURN METHOD WHEN MEMBER SUBSCRIPTION SUCCEEDS | O |

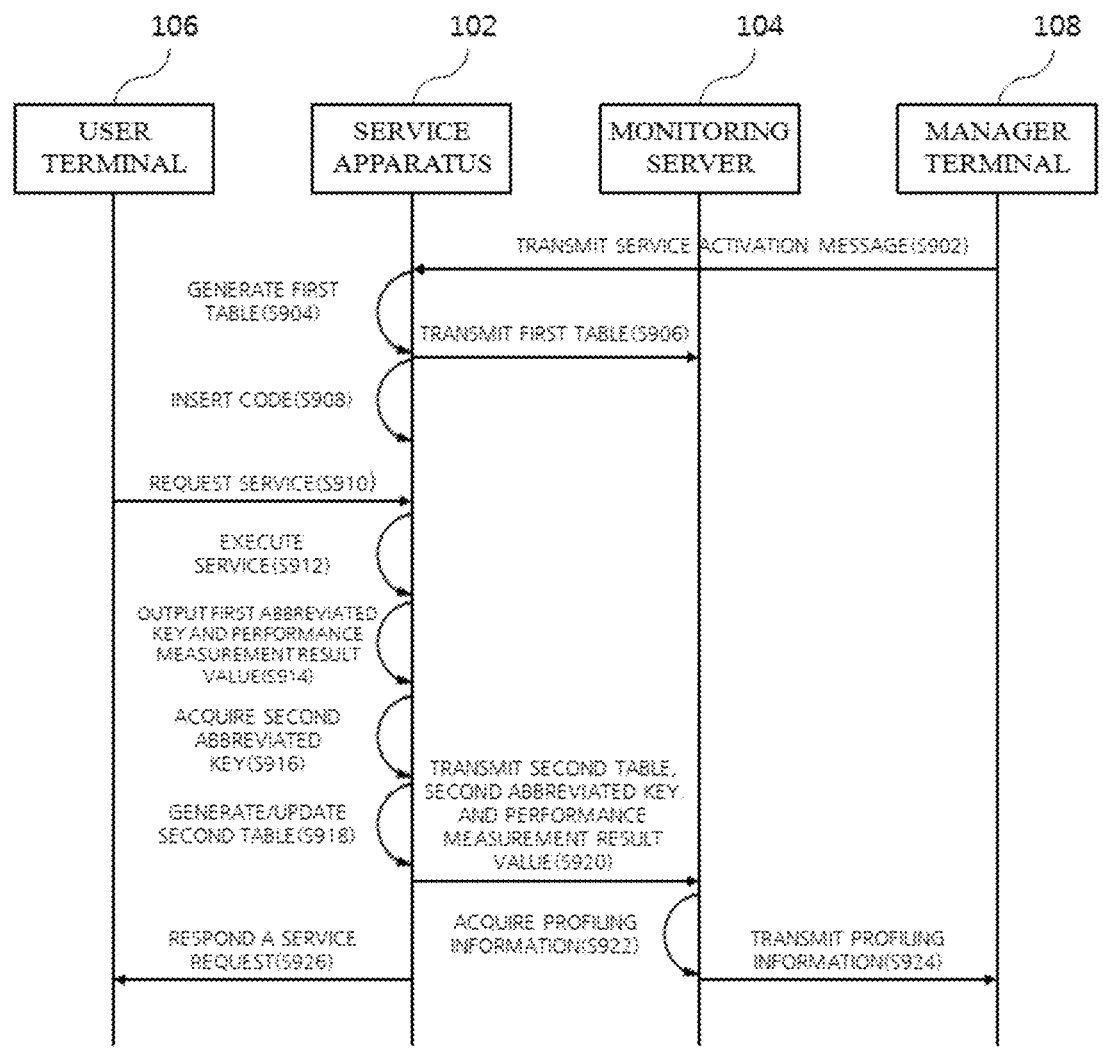

SYSTEM AND METHOD FOR MONITORING SERVICE

CROSS-REFERENCE TO RELATED APPLICATION

This application claims priority to and the benefit of Korean Patent Application No. 10-2016-0047547, filed on Apr. 19, 2016, the disclosure of which is incorporated herein by reference in its entirety.

BACKGROUND

1. Field

Embodiments of the present disclosure relate to a technique for efficiently monitoring a bottleneck in a transaction of a service.

2. Discussion of Related Art

Application performance management (APM) or application program performance management refers to a system management principle that focuses on monitoring and management of service availability and performance of an application program. Recently, as various complicated services are provided to users, the importance of a performance management technique for immediately executing a transaction desired by a user is increasing.

However, a conventional performance management technique has a problem in that much load is applied to limited infrastructure resources because profiling information on a transaction is transmitted to a monitoring server in the form of text. Also, in order to solve the problem, an attempt has been made to reduce the amount of data transmitted to the monitoring server by transmitting profiling information on only a portion of a transaction to the monitoring server or by using various algorithms. However, these methods have limitations in terms of load reduction.

Furthermore, according to the conventional performance management technique, profiling information on only a predetermined monitoring range is acquired in order to reduce the load. In this case, it is impossible to monitor all sections of a transaction. Accordingly, according to the conventional performance management technique, it is impossible to analyze a cause of a problem when the problem occurs outside the monitoring range, and thus it is difficult to accurately find a bottleneck in a transaction.

SUMMARY

The present disclosure is directed to providing a unit for monitoring all sections in a transaction of a service to minimize a load generated during a monitoring process.

According to an aspect of the present disclosure, there is provided a service monitoring system including a service apparatus configured to: convert text information corresponding to a functional block from among one or more functional blocks of a target service into a first abbreviated key, add the first abbreviated key and the text information to a first table, convert call flow information into a second abbreviated key, the call flow information indicating an order in which the one or more functional blocks are called when the target service is executed, and add the second abbreviated key and the call flow information to a second table; and a monitoring server configured to receive the first table and the second table from the service apparatus, and to acquire profiling information regarding the functional block using the first table and the second table.

Before the target service is executed, the service apparatus may insert into the functional block an abbreviated key outputting code for outputting the first abbreviated key and a performance measuring code for measuring performance of the functional block.

The service apparatus may convert the call flow information into the second abbreviated key using one or more first abbreviated keys corresponding to the one or more functional blocks when the target service is executed.

The service apparatus may acquire the call flow information by sequentially arranging the one or more first abbreviated keys.

The first abbreviated key may comprise a hash value acquired by hashing the text information, and the second abbreviated key may comprise a hash key acquired by hashing the call flow information.

The service apparatus may transmit the second abbreviated key acquired from the one or more first abbreviated keys and a performance measurement result value acquired by the performance measuring code to the monitoring server.

The performance measuring code may include one or more instructions for calculating a difference between an execution start time and an execution end time of the functional block, acquiring a response time of the functional block, and outputting the response time as the performance measurement result value when the functional block is executed.

The monitoring server may restore the text information corresponding to the functional block from the second abbreviated key received from the service apparatus by referring to the first table and the second table.

The profiling information may include the text information corresponding to the functional block restored by the monitoring server and the performance measurement result value for the functional block.

According to an aspect of the present disclosure, there is provided a service monitoring method including converting, by a service apparatus, text information corresponding to a functional block from among one or more functional blocks of a target service into a first abbreviated key; adding, by the service apparatus, the first abbreviated key and the text information to a first table; converting, by the service apparatus, call flow information into a second abbreviated key, the call flow information indicating an order in which the one or more functional blocks are called when the target service is executed; adding, by the service apparatus, the second abbreviated key and the call flow information to a second table; receiving, by a monitoring server, the first table and the second table from the service apparatus; and acquiring, by the monitoring server, profiling information regarding the functional block using the first table and the second table.

The service monitoring method may further include inserting, by the service apparatus, an abbreviated key outputting code for outputting the first abbreviated key of the functional block and a performance measuring code for measuring performance of the functional block into the functional block before the target service is executed.

The converting of the call flow information into the second abbreviated key may comprise converting the call flow information into the second abbreviated key by using one or more first abbreviated keys corresponding to the one or more functional blocks when the target service is executed.

The converting of the call flow information into the second abbreviated key may comprise acquiring the call flow information by sequentially arranging the one or more first abbreviated keys.

The first abbreviated key may comprise a hash value acquired by hashing the text information, and the second abbreviated key may comprise a hash key acquired by hashing the call flow information.

The service monitoring method may further include transmitting, by the service apparatus, the second abbreviated key acquired from the one or more first abbreviated keys and a performance measurement result value acquired by the performance measuring code to the monitoring server before the profiling information is acquired.

The performance measuring code may include one or more instructions for calculating a difference between an execution start time and an execution end time of the functional block, acquiring a response time of the functional block, and outputting the response time as the performance measurement result value when the functional block is executed.

The acquiring of the profiling information may comprise restoring the text information from the second abbreviated key received from the service apparatus by referring to the first table and the second table.

The profiling information may include the text information corresponding to the functional block restored by the monitoring server and the performance measurement result value for the functional block.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 3 is an example diagram of a first table according to an embodiment of the present disclosure;

FIG. 4 is an example diagram of a second table according to an embodiment of the present disclosure;

FIG. 5 is a block diagram showing a detailed configuration of a monitoring server according to an embodiment of the present disclosure;

FIG. 6 is an example diagram of profiling information according to an embodiment of the present disclosure;

FIG. 7 is an example diagram of a Java transaction to be monitored according to a conventional technique;

FIG. 8 is an example diagram of a Java transaction to be monitored according to an embodiment of the present disclosure; and FIG. 9 is a flowchart illustrating a service monitoring method according to an embodiment of the present disclosure.

DETAILED DESCRIPTION OF EXEMPLARY EMBODIMENTS

Hereinafter, embodiments of the present disclosure will be described in detail with reference to the accompanying drawings. The following detailed description is provided to assist the reader in gaining a comprehensive understanding of the methods, apparatuses, and/or systems described herein. However, the description is only an example, and the present disclosure is not limited thereto.

When it is determined that a detailed description of known techniques associated with the present disclosure would unnecessarily obscure the subject matter of the present disclosure in the description of embodiments of the present disclosure, the detailed description thereof will be omitted. Also, terms used herein are defined in consideration of the functions of the present disclosure and may be changed depending on a user, the intent of an operator, or a custom. Accordingly, the terms should be defined based on the following overall description of this specification. The terminology used herein is for the purpose of only describing embodiments of the present disclosure and should not be restrictive. The singular forms "a," "an," and "the" are intended to include the plural forms as well, unless the context clearly indicates otherwise. It should be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
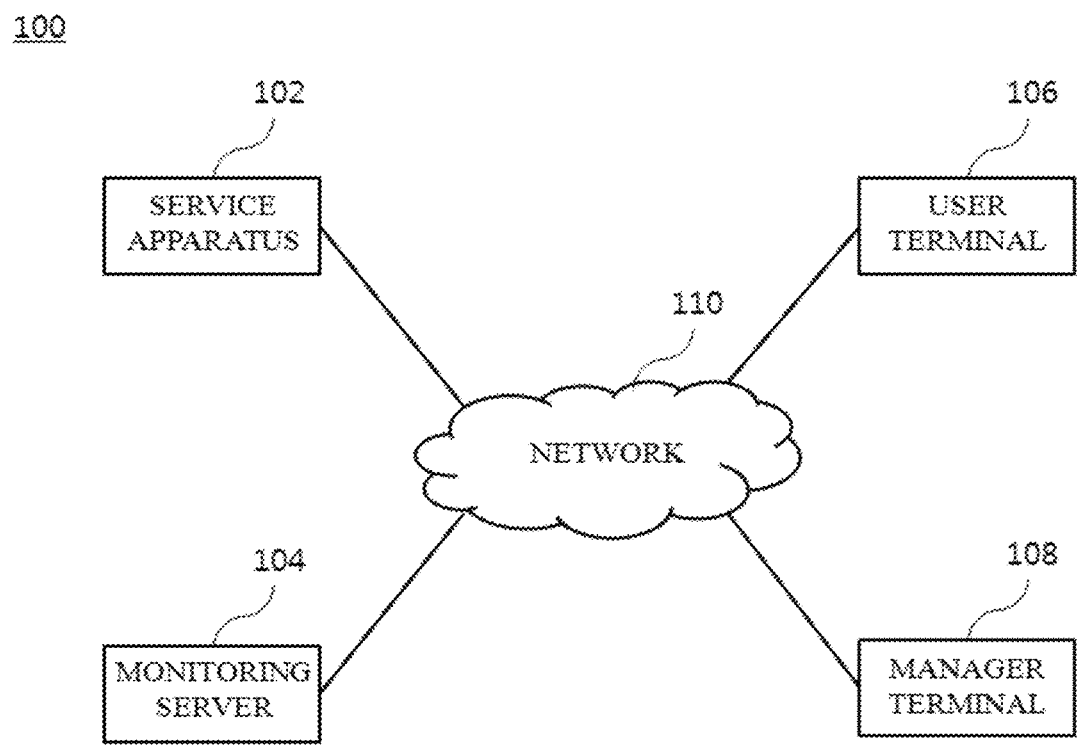
FIG. 1 is a block diagram showing a detailed configuration of a service monitoring system according to an embodiment of the present disclosure.

FIG. 1 is a block diagram showing a detailed configuration of a service monitoring system 100 according to an embodiment of the present disclosure. As shown in FIG. 1, the service monitoring system 100 according to an embodiment of the present disclosure includes a service apparatus 102, a monitoring server 104, a user terminal 106, and a manager terminal 108. The service apparatus 102, the monitoring server 104, the user terminal 106, and the manager terminal 108 may be connected to each other through a network 110. Here, the network 110 is used in a broad sense to include a 3G network, a 4G network, or a long term evolution (LTE) network provided by a mobile communication service provider, a packet communication network such as a Wibro network, and a company intranet.

The service apparatus 102 is a server that manages a service provided to a user. The service apparatus 102 receives a service request message from the user terminal 106 and executes a service in response to the received service request message. According to these embodiments, the service may be software, an application, or a system written in a machine language such as Java, C++, and C#. Examples of the service may include a "member registration" service, a "real-name authentication" service, and a "password change" service. The service may be composed of one or more functional blocks. A functional block refers to a set of instructions for performing specific functions such as a class, a method, and structured query language (SQL).

The service apparatus 102 may provide various kinds of services to a user, and each of the services may be represented as a transaction to which one or more functional blocks are sequentially coupled. In this case, in order to monitor a transaction of a service executed by the service apparatus 102 on a functional block basis, text information and performance information on each of the functional blocks in the transaction should be transmitted to the monitoring server 104. However, the text information on each of the functional blocks is large in size. Accordingly, when the text information and performance information on all of the functional blocks in the transaction are transmitted to the monitoring server 104, much load may be applied to limited infrastructure resources (central processing units (CPUs), memories, etc. of network resources, the service apparatus 102, and the monitoring server 104). In order to solve such a problem, the service apparatus 102 may transmit only text information and performance information on some of the functional blocks in the transaction to the monitoring server 104. In this case, however, it is impossible to monitor all sections in the transaction, and thus it may be difficult to accurately find a bottleneck in the transaction. Accordingly, according to embodiments of the present disclosure, the service apparatus 102 may generate a first table and a second table and transmit the first table and the second table to the monitoring server 104, and the monitoring server 104 may monitor all sections in the transaction of the service on a functional block basis by using the first table and the second table.

In detail, first, the service apparatus 102 may convert text information on each of one or more functional blocks constituting a service to be monitored (hereinafter referred to as a target service) among services provided to a user into a first abbreviated key and generate a first table including a pair of the first abbreviated key and the text information. Here, the target service may include any kind of service provided by the service apparatus 102, but is not limited thereto. The target service may include some services designated by a manager from among the services provided by the service apparatus 102. According to these embodiments, the text information on each of the functional blocks is string information indicating the corresponding functional block. For example, the text information may be a class name, a method name, an SQL instruction name of a database, a query instruction name of Cassandra, etc.

The service apparatus 102 may extract the text information on each of the functional blocks constituting the target service by inserting a string extracting code for extracting the text information on each of the functional blocks into the corresponding functional block. For example, the service apparatus 102 may insert the string extracting code into the functional block through a bytecode instrument (BCI) technique. A BCI refers to a technique for dynamically performing insertion of a specific byte code of a service source code (an original code) without modification during an execution step of a service. A bytecode is a compiled form of a Java program and may be executed by a Java virtual machine.

The service apparatus 102 may apply a hash function to the extracted text information to acquire a hash value (a first abbreviated key). Here, the hash function may be, for example, SHA-1, SHA-256, SHA-384, or MD5. The service apparatus 102 may set the hash value for the text information, i.e., the first abbreviated key, in the KEY column, set the corresponding text information in the VALUE column, and then generate the first table including a pair of the first abbreviated key and the text information. The service apparatus 102 may repeat the above process for each target service and may update the first table by continuously adding a pair of a first abbreviated key and text information to the first table.

Also, whenever the first table is updated, the service apparatus 102 may transmit the first table to the monitoring server 104. Accordingly, a first table stored in the service apparatus 102 may be synchronized in real time with a first table stored in the monitoring server 104.

Next, the service apparatus 102 inserts an abbreviated key outputting code for outputting a first abbreviated key corresponding to a corresponding functional block and a performance measuring code for measuring performance of the corresponding functional block into the each of the functional blocks. For example, the service apparatus 102 may insert the abbreviated key outputting code and the performance measuring code into the each of the functional blocks by using the BCI technique.

The abbreviated key outputting code may include the first abbreviated key corresponding to the functional block among first abbreviated keys stored in the first table and one or more instructions for outputting the first abbreviated key. Accordingly, when the functional block is executed, the abbreviated key outputting code included in the functional block may output the first abbreviated key corresponding to the functional block.

Also, the performance measuring code may include one or more instructions for calculating a difference between an execution start time and an execution end time of the functional block, acquiring a response time of the functional block, and outputting the response time as a performance measurement result value when the functional block is executed. Accordingly, when the functional block is executed, the performance measuring code may output the performance measurement result value of the functional block.

As an example, when target service A is executed, a first abbreviated key and a performance measurement result value of each of class 1/method 1, class 1/method 2, and class 1/method 3, which are functional blocks constituting the target service A, may be output. Examples of a pair of the first abbreviated key and the performance measurement result value are as follows:

(first abbreviated key, performance measurement result value)=(Nb61kIF2Fk, 10 ms)

(first abbreviated key, performance measurement result value)=(b93LD1FDjh, 23 ms)

(first abbreviated key, performance measurement result value)=(Qlka3ioD3O, 20 ms).

Next, the service apparatus 102 may convert call flow information of functional blocks in a transaction of the target service into a second abbreviated key by using first abbreviated keys that are output by the abbreviated key outputting code when the target service is executed, and may generate a second table including a pair of the second abbreviated key and the call flow information. Here, the call flow information is information indicating an order in which the functional blocks in the transaction of the target service are called (or executed) when the target service is executed. The service apparatus 102 may acquire the call flow information by sequentially arranging the first abbreviated keys output by the abbreviated key outputting code, and may acquire a hash value (the second abbreviated key) by applying a hash function to the sequentially arranged first abbreviated keys (i.e., the call flow information). Here, the hash function may be, for example, SHA-1, SHA-256, SHA-384, or MD5. The service apparatus 102 may set the hash value for the call flow information, i.e., the second abbreviated key, in the KEY column, set the corresponding call flow information in the VALUE column, and then generate a second table including a pair of the second abbreviated key and the call flow information. Also, when the second abbreviated key is acquired, the service apparatus 102 may query whether the second abbreviated key is present in the second table. When the second abbreviated key is not present in the second table, the service apparatus 102 may update the second table by adding the pair of the second abbreviated key and the call flow information to the second table. When the second abbreviated key is present in the second table, the service apparatus 102 may load the pair of the second abbreviated key and the call flow information stored in the second table.

Also, whenever the second table is updated, the service apparatus 102 may transmit the second table to the monitoring server 104. Accordingly, a second table stored in the service apparatus 102 may be synchronized in real time with a second table stored in the monitoring server 104.

Examples of the pair of the second abbreviated key and the call flow information are as follows:

(second abbreviated key, call flow information)=(Bdfk, Nb61kIF2Fklb93LD1FDjhlQ1ka3ioD3O), where Nb61kIF2 is an example of the first abbreviated key of class 1/method 1, b93LD1FDjh is an example of the first abbreviated key of class 1/method 2, Qlka3ioD3O is an example of the first abbreviated key of class 1/method 3, and l is an example of a separator for separating the arranged first abbreviated keys.

Next, the service apparatus 102 transmits the second abbreviated key acquired from the first abbreviated keys output by the abbreviated key outputting code and the performance measurement result value for the functional blocks acquired by the performance measuring code to the monitoring server 104. That is, according to embodiments of the present disclosure, it is possible to greatly reduce the amount of data transmitted to the monitoring server 104 by the service apparatus 102 transmitting only the second abbreviated key and the performance measurement result value of the corresponding functional block in the transaction of the target service to the monitoring server 104 rather than transmitting all of the text information and the performance measurement result value of the corresponding functional block to the monitoring server 104.

The monitoring server 104 is a server configured to acquire profiling information on the target service and transmit the acquired profiling information to the manager terminal 108. According to these embodiments, profiling refers to an action of collecting information such as an execution start time, an execution end time, and a response time for each functional block (a method, SQL, etc.) in order to measure performance for each element (i.e., for each functional block) of the transaction and check for a bottleneck. Also, as described below, the profiling information may include the text information on the functional blocks, which is restored by the monitoring server 104, and the performance measurement result values for the functional blocks.

As described above, the monitoring server 104 may receive the first table and the second table from the service apparatus 102. In this case, the monitoring server 104 may store the first table and the second table received from the service apparatus 102 in an internal database. Also, whenever the first table and second table stored in the service apparatus 102 are updated, the monitoring server 104 may receive the updated first table and second table (or updated information in the first table and the second table) from the service apparatus 102. Accordingly, the first table and second table stored in the monitoring server 104 may be synchronized with the first table and second table stored in the service apparatus 102.

Also, the monitoring server 104 may receive a second abbreviated key for a target service being executed and a performance measurement result value for each functional blocks of the target service from the service apparatus 102. The monitoring server 104 may restore text information on the corresponding functional block from the second abbreviated key received from the service apparatus 102 by referring to the first table and second table stored in the monitoring server 104. In detail, the monitoring server 104 may restore sequentially arranged first abbreviated keys from the second abbreviated key received from the service apparatus 102 by referring to the second table and may restore the text information on the functional blocks from the first abbreviated keys by referring to the first table. As described above, since the first table and second table stored in the monitoring server 104 are synchronized in real time with the first table and second table stored in the service apparatus 102, the monitoring server 104 may restore the text information on the functional blocks from the second abbreviated key received from the service apparatus 102 by using the first table and the second table. In this case, since first abbreviated keys restored by the monitoring server 104 are arranged in a call flow order of the functional blocks, the restored text information may also be arranged in the call flow order of the functional blocks. Accordingly, the text information restored by the monitoring server 104 may sequentially correspond to the performance measurement result values for the functional blocks received from the service apparatus 102.

According to embodiments of the present disclosure, the profiling information on the target service may include the text information on the functional block restored by the monitoring server 104 and the performance measurement result values for the functional blocks. The monitoring server 104 may transmit the acquired profiling information to the manager terminal 108, and a manager may monitor the profiling information through the manager terminal 108.

That is, according to embodiments of the present disclosure, since the monitoring server 104 uses the first table and the second table to acquire the profiling information on the target service on a functional block basis, a manager may monitor all sections in the transaction of the target service and thus accurately and rapidly find a bottleneck of the transaction.

The user terminal 106 is a terminal that is carried or handled by a user, and may transmit a service request message to the service apparatus 102 upon a request from the user. The user terminal 106 may be, for example, a desktop, a notebook, a tablet PC, or a smartphone. The service apparatus 102 may receive the service request message from the user terminal 106 and execute a service in response to the received service request message.

The manager terminal 108 is a terminal that is carried or handled by a manager and may transmit a service activation message to the service apparatus 102 upon a request from the manager. The service apparatus 102 may receive the service activation message from the manager terminal 108 and prepare to activate a service. According to these embodiments, the preparation for activation of the service refers to an action of generating the first table before the target service is executed and inserting an abbreviated key outputting code and a performance measuring code into each functional block of the target service.

Also, the manager terminal 108 may receive profiling information on the target service from the monitoring server 104, and the manager may monitor the profiling information through the manager terminal 108. In this case, the manager terminal 108 may display the profiling information on a functional block basis. For example, the manager terminal 108 may display a pair of text information and a performance measurement result value (e.g., a response time) for each of the functional blocks. Accordingly, the manger may accurately and rapidly find which functional block corresponds to a bottleneck. Also, the manager terminal 108 may select a performance measurement result value falling outside a predetermined range among performance measurement result values for the functional blocks, determine text information corresponding to the selected performance measurement result value, and display the performance measurement result value and the text information.

Figure 2:
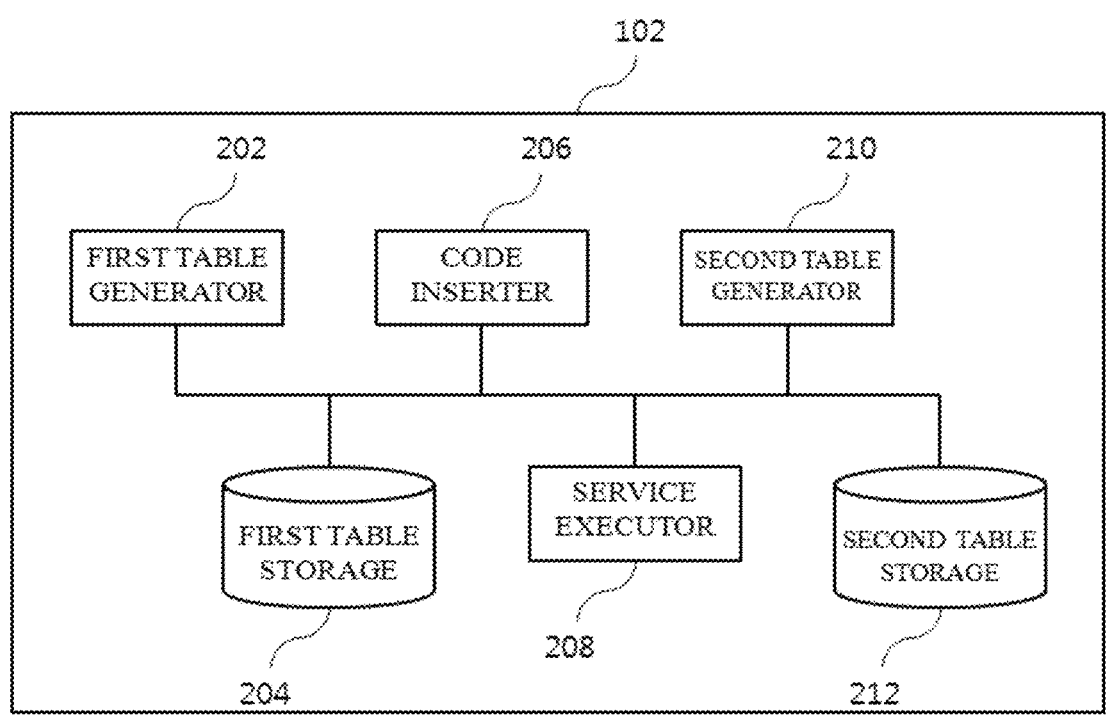
FIG. 2 is a block diagram showing a detailed configuration of a service apparatus according to an embodiment of the present disclosure.

FIG. 2 is a block diagram showing a detailed configuration of the service apparatus 102 according to an embodiment of the present disclosure. As shown in FIG. 2, the service apparatus 102 according to an embodiment of the present disclosure includes a first table generator 202, a first table storage 204, a code inserter 206, a service executor 208, a second table generator 210, and a second table storage 212.

The first table generator 202 converts text information on each of one or more functional blocks constituting a target service into a first abbreviated key and generates a first table including a pair of the first abbreviated key and the text information. Before the target service is executed, the first table generator 202 may receive a service activation message from the manager terminal 108 and generate the first table according to the service activation message. The first table generator 202 may extract the text information on each of the functional blocks constituting the target service by inserting a string extracting code for extracting the text information on each of the functional blocks into the each of the functional blocks. As an example, the first table generator 202 may insert a string extracting code into the Servlet method in order to acquire a class name and a method name, insert a string extracting code into the PrepareStatment method in order to acquire an SQL instruction name of a database, and insert a string extracting code into the Query_1 method in order to acquire a query instruction name of Cassandra. Also, the first table generator 202 may apply the extracted text information to a hash function to acquire a hash value (the first abbreviated key), generate a first table including a pair of the first abbreviated key and the text information, and store the first table in the first table storage 204. The first table generator 202 may repeat the above process for each target service and may update the first table stored in the first table storage 204 by continuously adding a pair of a first abbreviated key and text information to the first table.

Also, whenever the first table is updated, the first table generator 202 may transmit the updated first table to the monitoring server 104. Accordingly, the first table stored in the first table storage 204 may be synchronized in real time with the first table of the monitoring server 104.

The following code is an example source code indicating a process in which SQL information is added to the first table by the first table generator 202. Here, the bolded part is a source code for performing the following functions 1 to 4.

```
1. Choose a position at which a string extracting code is inserted into
prepareStatement using MethodVisitor of BCI
    public MethodVisitor visitMethod(final int access, final String name,
            final String desc, final String signature, final String[ ] exceptions) {
        MethodVisitor mv = cv.visitMethod(access, name, desc, signature,exceptions);
        if( mv != null && name.equals("prepareStatement") ){
            mv = new JdbcPrepareMethodVisitor(mv, access, name, desc);
        }
        return mv == null ? null : mv;
    }
    ... (omitted)
2. Start insertion of a string extracting code when "prepareStatement" is executed
    protected JdbcPrepareMethodVisitor( MethodVisitor mv, int access, String name,
String desc) }
        super(ASM4, mv, access, name, desc);
    }
    ... (omitted)
3. Extract SQL information transferred to a parameter in an END step of
prepareStatment
    public static void_endPrepareTrace(String sql, long startTime){
        ... (omitted)
            Result result = CacheHelper.put(sql, TcpOpcodes.SQL_CACHE_SEND);
    }
    ... (omitted)
4. Generate a first abbreviated key (an n byte key) using a hash function of
java.Object class and add the first abbreviated key to a first table
    public Result put(T value) {
        final Result find = this.cache.get(value);
        if (find != null) {
            return find;
        }
        final int newId = value.hashCode( );
        final Result result = new Result(false, newId);
        final Result before = this.cache.putIfAbsent(value, result);
        if (before != null) {
            return before;
        }
        return new Result(true, newId);
    }
```

The first table storage 204 is a storage in which the first table generated by the first table generator 202 is stored. The first table generator 202 may generate the first table and store the generated first table in the first table storage 204. Whenever a new pair of a first abbreviated key and text information is acquired, the first table generator 202 may update the first table stored in the first table storage 204.

The code inserter 206 inserts an abbreviated key outputting code for outputting a first abbreviated key of a corresponding functional block and a performance measuring code for measuring performance of the corresponding functional block into the each of the functional blocks. As described above, text information on each functional block in a transaction of a target service may be expressed as the first abbreviated key. Before a target service is executed, the code inserter 206 may insert the abbreviated key outputting code and the performance measuring code into the each of the functional blocks by using the BCI technique. Accordingly, when the functional block is executed, the abbreviated key outputting code included in the functional block may output the first abbreviated key corresponding to the functional block, and the performance measuring code included in the functional block may output a performance measurement result value of the functional block. Here, the performance measuring code may include one or more instructions for calculating a difference between an execution start time and an execution end time of the functional block, acquiring a response time of the functional block, and outputting the response time as the performance measurement result value when the functional block is executed.

The service executor 208 receives a service request message from the user terminal 106 and executes the target service in response to the received service request message. The target service may be, for example, a "member registration" service, a "real-name authentication" service, or a "password change" service.

The second table generator 210 converts call flow information of the functional blocks into a second abbreviated key by using first abbreviated keys that are output by the abbreviated key outputting code when the target service is executed and generates a second table including a pair of the second abbreviated key and the call flow information. Generally, the target service is executed while the function blocks, which are included in the transaction of the target service, have the same call flow information when the service is started. Accordingly, embodiments of the present disclosure are configured to significantly reduce the amount of data transmitted to the monitoring server by using redundancy of the call flow information.

In detail, the second table generator 210 may acquire the call flow information by sequentially arranging the first abbreviated keys output by the abbreviated key outputting code and may acquire a hash value (the second abbreviated key) by applying a hash function to the sequentially arranged first abbreviated keys (i.e., the call flow information). The second table generator 210 may query the second table storage 212 about whether the acquired second abbreviated key is present in the second table. When the second abbreviated key is not present in the second table, the second table generator 210 may update the second table by adding the pair of the second abbreviated key and the call flow information to the second table.

Also, whenever the second table is updated, the second table generator 210 may transmit the updated second table to the monitoring server 104. Accordingly, the second table stored in the second table storage 212 may be synchronized in real time with the second table of the monitoring server 104. Also, the second table generator 210 may have limitations on the number of first abbreviated keys included in the VALUE column of the second table in order to prevent an overflow of the second table storage 212. For example, when the number of first abbreviated keys included in the VALUE column of the table is 100 or more, the second table generator 210 may not include any other first abbreviated keys in the VALUE column of the second table.

Also, the second table generator 210 may periodically perform a health check on the monitoring server 104 to determine whether there is a failure in the monitoring server 104. When it is determined that there is a failure in the monitoring server 104, the second table generator 210 may determine that a second table that has been stored in the service apparatus 102 after it was determined that there was the failure in the monitoring server 104 does not match the second table stored in the monitoring server 104. Accordingly, the second table generator 210 may synchronize the second table stored in the monitoring server 104 with the second table stored in the service apparatus 102 after it has been determined that there was a failure in the monitoring server 104. In this case, the second table stored in the monitoring server 104 may be perfectly synchronized with the second table stored in the service apparatus 102. This heath check process may be performed in the same way by the above-described first table generator 202. In this case, the first table stored in the monitoring server 104 may be perfectly synchronized with the first table stored in the service apparatus 102.

The second table storage 212 is a storage in which the second table generated by the second table generator 210 is stored. The second table generator 210 may generate the second table and store the generated second table in the second table storage 212. Whenever a new pair of a second abbreviated key and call flow information is acquired, the second table generator 210 may update the second table stored in the second table storage 212.

FIG. 3 is an example diagram of a first table according to an embodiment of the present disclosure. As shown in FIG. 3, the first table may include a pair of a first abbreviated key (in the KEY column) and text information (in the VALUE column) for each functional block. The first abbreviated key may include, for example, one or more characters, one or more numbers, or a combination thereof. In FIG. 3, the first abbreviated key is shown as including a combination of characters and numbers having a size of 10 bytes, but is not limited thereto. Also, the text information on the corresponding functional block may be, for example, a class name, a method name, an SQL instruction name of a database, a query instruction name of Cassandra, etc.

As described above, the first table generator 202 may abbreviate text information composed of a long string to a short string of about 10 bytes by applying a hash function to extracted text information to acquire a hash value and setting the hash value as the first abbreviated key. The generated first abbreviated key may be used as an entry in the VALUE column of the second table.

FIG. 4 is an example diagram of a second table according to an embodiment of the present disclosure. As shown in FIG. 4, the second table may include a pair of a second abbreviated key (in the KEY column) and call flow information (in the VALUE column). As described above, the second table generator 210 may acquire the call flow information by sequentially arranging first abbreviated keys output by the abbreviated key outputting code when the target service is executed, and may acquire a hash value by applying a hash function to the sequentially arranged first abbreviated keys (i.e., the call flow information). In this case, the hash value of the sequentially arranged first abbreviated keys is considered to be the second abbreviated key, and the sequentially arranged first abbreviated keys are included in the VALUE column. The second abbreviated key may include, for example, one or more characters, one or more numbers, or a combination thereof. In FIG. 4, the second abbreviated key is shown as including a combination of characters and numbers having a size of 4 bytes, but is not limited thereto.

FIG. 5 is a block diagram showing a detailed configuration of the monitoring server 104 according to an embodiment of the present disclosure. As shown in FIG. 5, the monitoring server 104 includes a restorator 502, a first table storage 504, and a second table storage 506.

The restorator 502 acquires profiling information on a target service being executed by using a first table stored in the first table storage 504 and a second table stored in the second table storage 506. As described above, the service apparatus 102 may transmit the first table and second table stored in the service apparatus 102 to the monitoring server 104 in real time. The first table and second table received from the service apparatus 102 may be respectively stored in the first table storage 504 and the second table storage 506. Accordingly, the first table and second table stored in the service apparatus 102 may be synchronized in real time with the first table and second table respectively stored in the monitoring server 104.

The restorator 502 may receive the second abbreviated key for the target service being executed and performance measurement result values of the functional blocks of the target service from the service apparatus 102, and may restore the text information on the functional blocks from the second abbreviated key received from the service apparatus 102 by referring to the first table stored in the first table storage 504 and the second table stored in the second table storage 506. In detail, the restorator 502 may restore the sequentially arranged first abbreviated keys from the second abbreviated key received from the service apparatus 102 by referring to the second table and may restore the text information on the functional blocks from the first abbreviated keys by referring to the first table. The text information restored by the monitoring server 104 may sequentially correspond to the performance measurement result values for the functional blocks received from the service apparatus 102. Accordingly, the profiling information may include the text information on the functional blocks restored by the monitoring server 104 and the performance measurement result values for the functional blocks.

The restorator 502 may transmit the acquired profiling information to the manager terminal 108, and a manager may monitor the profiling information through the manager terminal 108.

The first table storage 504 is a storage in which the first table received from the service apparatus 102 is stored. Whenever a new pair of a first abbreviated key and text information is acquired, the service apparatus 102 may update the first table stored in the service apparatus 102 and transmit the updated first table to the monitoring server 104.

The second table storage 506 is a storage in which the second table received from the service apparatus 102 is stored. Whenever a new pair of a second abbreviated key and call flow information is acquired, the service apparatus 102 may update the second table stored in the service apparatus 102 and transmit the updated second table to the monitoring server 104. The first table stored in the first table storage 504 and the second table stored in the second table storage 506 may be used by the restorator 502 to restore the first abbreviated keys and the text information on the functional blocks from the second abbreviated key received from the service apparatus 102.

FIG. 6 is an example diagram of profiling information according to an embodiment of the present disclosure. As shown in FIG. 6, the profiling information may include the text information on the functional blocks restored by the monitoring server 104 and the performance measurement result values for the functional blocks. Here, the performance measurement result values may be, for example, response times (ms) for the functional blocks acquired by the performance measuring code. The monitoring server 104 may transmit the profiling information to the manager terminal 108, and a manager may monitor the profiling information through the manager terminal 108. Accordingly, the manager may monitor all sections in the transaction of the target service and thus may accurately and rapidly find a bottleneck in the transaction.

FIG. 7 is an example diagram of a Java transaction to be monitored according to a conventional technique, and FIG. 8 is an example diagram of a Java transaction to be monitored according to an embodiment of the present disclosure. Here, it is assumed that a user requests a "member registration" service from the service apparatus 102 to receive a web-based service provided by the service apparatus 102.

First, as shown in FIG. 7, according to the conventional technique, it is possible to monitor only a functional block (e.g., a user ID redundancy query SQL execution block, a real-name authentication method execution block, and a member information insertion SQL execution block) that is set in the Java transaction. That is, according to the conventional technique, it is impossible to monitor all sections in the transaction. Accordingly, it is impossible to analyze a cause of a problem when the problem occurs outside a monitoring range, and thus it is difficult to accurately find a bottleneck in the transaction.

Next, as shown in FIG. 8, according to embodiments of the present disclosure, it is possible to monitor all of the sections in the Java transaction on a functional block basis, and thus a manager may accurately and rapidly find a bottleneck in the Java transaction.

FIG. 9 is a flowchart illustrating a service monitoring method according to an embodiment of the present disclosure. Although the method has a plurality of steps in the flowchart that is shown, at least some of the steps may be performed in a different order, performed in combination with other steps, omitted, performed as sub-steps, or performed in addition to one or more steps that are not shown.

In step S902, the manager terminal 108 transmits a service activation message to the service apparatus 102.

In step S904, the service apparatus 102 generates a first table when the service activation message is received from the manager terminal 108. To this end, the service apparatus 102 may extract text information on each functional block constituting a target service by inserting a string extracting code into the each functional block, and may acquire a hash value (a first abbreviated key) by applying a hash function to the extracted text information. Accordingly, the service apparatus 102 may generate a first table including a pair of the first abbreviated key and the text information and store the first table in an internal database.

In step S906, the service apparatus 102 may transmit the first table to the monitoring server 104. The monitoring server 104 may store the first table received from the service apparatus 102 in an internal database. Accordingly, the first table stored in the service apparatus 102 may be synchronized with the first table stored in the monitoring server 104.

In step S908, the service apparatus 102 inserts an abbreviated key outputting code and a performance measuring code into each of the functional blocks. Accordingly, when each of the functional blocks are executed in accordance with the target service being started in steps S912 and S914, which will be described below, the abbreviated key outputting code included in the corresponding functional block may output a first abbreviated key corresponding to the functional block, and the performance measuring code included in the functional block may output a performance measurement result value of the functional block.

In step S910, the service apparatus 102 receives a service request message from the user terminal 106.

In step S912, the service apparatus 102 executes a service corresponding to the service request message according to the service request message of the user terminal 106.

In step S914, when functional blocks which are included in a transaction of the service are sequentially executed, first abbreviated keys and performance measurement result values corresponding to the functional blocks may be output by the abbreviated key outputting code and the performance measuring code.

In step S916, the service apparatus 102 acquires a second abbreviated key by using the output first abbreviated keys. In detail, the service apparatus 102 may acquire call flow information of the functional blocks by sequentially arranging the output first abbreviated keys and may acquire the second abbreviated key by hashing the acquired call flow information.

In step S918, the service apparatus 102 generates a second table including a pair of the second abbreviated key and the call flow information. Also, the service apparatus 102 may query whether the second abbreviated key acquired in step S916 is present in the second table. When the second abbreviated key is not present in the second table, the service apparatus 102 may update the second table by adding the pair of the second abbreviated key and the call flow information to the second table.

In step S920, the service apparatus 102 transmits a second table stored in the service apparatus 102 and the second abbreviated key and performance measurement result values acquired in step S914 and S916 to the monitoring server 104.

In step S922, the monitoring server 104 acquires profiling information on the target service on a functional block basis using the first table and second table received from the service apparatus 102. In detail, the monitoring server 104 may restore the text information on the functional blocks from the second abbreviated key received from the service apparatus 102 by referring to the first table and second table received from the service apparatus 102. Accordingly, the profiling information may include the text information on the functional blocks restored by the monitoring server 104 and the performance measurement result values for the functional blocks.

In step S924, the monitoring server 104 transmits the profiling information to the manager terminal 108. Accordingly, a manager may monitor all of the sections in the transaction of the target service and thus may accurately and rapidly find a bottleneck in the transaction.

Also, in step S926, the service apparatus 102 may respond to a service request of the user terminal 106.

Steps S902 to S908 may be performed before the target service is executed, and steps S914 to S926 may be performed during or after the execution of the target service.

Figure 10:
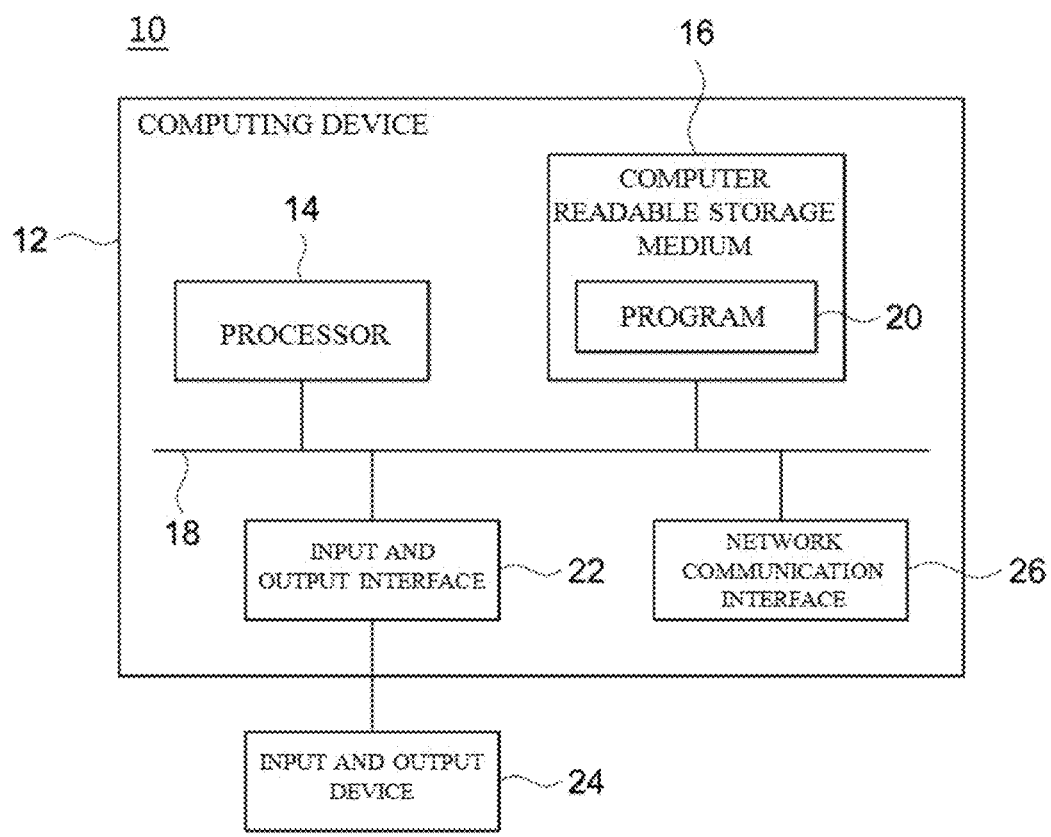
FIG. 10 is a block diagram illustrating an example of a computing environment including a computing system which is suitable for application of exemplary embodiments.

FIG. 10 is a block diagram illustrating an example of a computing environment 10 including a computing system which is suitable for application of exemplary embodiments. In an embodiment shown, each component may have a function and a capability different from those that will be described below, and an additional component may be included besides the components which will be described below.

The computing environment 10 may include a computing device 12. In an embodiment, the computing device 12 may be the service apparatus 102, the monitoring server 104, the user terminal 106, or the manager terminal 108.

The computing device 12 may include at least one processor 14, a computer readable storage medium 16, and a communication bus 18. The processor 14 may allow the computing device 12 to be operated according to the embodiment described above. For example, the processor 14 may execute one or more programs stored in the computer readable storage medium 16. The one or more programs may include one or more computer executable instructions, and when the computer executable instructions are executed by the processor 14, allow the computing device 12 to perform the operations according to the embodiment.

The computer readable storage medium 16 may be configured to store computer executable instructions and program codes, program data, and/or other suitable forms of information. A program 20 stored in the computer readable storage medium 16 may include a set of instructions executable by the processor 14. In an embodiment, the computer readable storage medium 16 may be a memory (a volatile memory such as a random access memory, a non-volatile memory, or a combination thereof), one or more magnetic disk storage devices, optical disk storage devices, flash memory devices, different kinds of storage media which can be accessed by the computing device 12 and store wanted information, or a combination thereof.

The communication bus 18 may include the processor 14 and the computer readable storage medium 16, and interconnect various components of the computing device 12.

The computing device 12 may include one or more I/O interfaces 22 that provide an interface of one or more I/O devices 24, and one or more network communication interfaces 26. The I/O interface 22 and the network communication interface 26 may be connected to the communication bus 18. The I/O device 24 may be connected to other components of the computing device 12 through the I/O interface 22. The I/O device 24 may include an input device such as a pointing device (a mouse, a track pad, etc.), a keyboard, a touch input device (a touch pad, a touch screen, etc.), a voice or sound input device, various kinds of sensors, and/or a capturing device, and/or an output device such as a display device, a printer, a speaker, and/or a network card. The I/O device 24 may be one component configuring the computing device 12, may be included in the computing device 12, and may be connected to the computing device 12 as a device which is separate from the computing device 12.

According to embodiments of the present disclosure, since the service apparatus transmits only the second abbreviated key and the performance measurement result value of the corresponding function block in the transaction of the target service to the monitoring server 104 rather than transmitting all of the text information and performance measurement result value of the corresponding function block to the monitoring server, it is possible to greatly reduce the amount of data transmitted to the monitoring server.

Also, according to embodiments of the present disclosure, since the monitoring server 104 acquires the profiling information on the target service on a functional block basis by using the first table and the second table, it is possible for a manger to monitor all sections in the transaction of the target service and thus accurately and rapidly find a bottleneck of the transaction.

Although the disclosure has been described with reference to exemplary embodiments, it should be understood by those skilled in the art that various changes may be made without departing from the spirit or scope of the disclosure. Thus, the scope of the present disclosure is to be determined by the following claims and their equivalents, and is not restricted or limited by the foregoing detailed description.

What is claimed is:

1. A service monitoring system comprising:
a service apparatus configured to:
convert text information corresponding to a functional block from among one or more functional blocks of a target service into a first abbreviated key,
add the first abbreviated key and the text information to a first table,
convert call flow information into a second abbreviated key, the call flow information indicating an order in which the one or more functional blocks are called when the target service is executed, and
add the second abbreviated key and the call flow information to a second table; and
a monitoring server configured to receive the first table and the second table from the service apparatus, and to acquire profiling information regarding the functional block using the first table and the second table,
wherein the functional block is a set of instructions for performing specific function of the target service,
wherein the service apparatus converts the call flow information into the second abbreviated key using one or more first abbreviated keys corresponding to the one or more functional blocks when the target service is executed.

2. The service monitoring system of claim 1, wherein before the target service is executed, the service apparatus inserts into the functional block an abbreviated key outputting code for outputting the first abbreviated key and a performance measuring code for measuring performance of the functional block.

3. The service monitoring system of claim 1, wherein the service apparatus acquires the call flow information by sequentially arranging the one or more first abbreviated keys.

4. The service monitoring system of claim 3, wherein:
the first abbreviated key comprises a hash value acquired by hashing the text information; and
the second abbreviated key comprises a hash key acquired by hashing the call flow information.

5. The service monitoring system of claim 2, wherein the service apparatus transmits the second abbreviated key acquired from the one or more first abbreviated keys and a performance measurement result value of each of the one or more functional blocks acquired by measuring a performance of each of the one or more functional blocks based on the performance measuring code to the monitoring server.

6. The service monitoring system of claim 5, wherein the performance measuring code includes one or more instructions for calculating a difference between an execution start time and an execution end time of the functional block, acquiring a response time of the functional block, and outputting the response time as the performance measurement result value when the functional block is executed.

7. The service monitoring system of claim 5, wherein the monitoring server restores the text information corresponding to the functional block from the second abbreviated key received from the service apparatus by referring to the first table and the second table.

8. The service monitoring system of claim 7, wherein the profiling information includes the text information corresponding to the functional block restored by the monitoring server and the performance measurement result value for the functional block.

9. A service monitoring method comprising:
converting, by a service apparatus, text information corresponding to a functional block from among one or more functional blocks of a target service into a first abbreviated key;
adding, by the service apparatus, the first abbreviated key and the text information to a first table;
converting, by the service apparatus, call flow information into a second abbreviated key, the call flow information indicating an order in which the one or more functional blocks are called when the target service is executed;
adding, by the service apparatus, the second abbreviated key and the call flow information to a second table;
receiving, by a monitoring server, the first table and the second table from the service apparatus; and
acquiring, by the monitoring server, profiling information regarding the functional block using the first table and the second table,
wherein the functional block is a set of instructions for performing specific function of the target service,
wherein the converting of the call flow information into the second abbreviated key comprises converting the call flow information into the second abbreviated key by using one or more first abbreviated keys corresponding to the one or more functional blocks when the target service is executed.

10. The service monitoring method of claim 9, further comprising inserting, by the service apparatus, an abbreviated key outputting code for outputting the first abbreviated key of the functional block and a performance measuring code for measuring performance of the functional block into the functional block before the target service is executed.

11. The service monitoring method of claim 9, wherein the converting of the call flow information into the second abbreviated key comprises acquiring the call flow information by sequentially arranging the one or more first abbreviated keys.

12. The service monitoring method of claim 11, wherein:
the first abbreviated key comprises a hash value acquired by hashing the text information; and
the second abbreviated key comprises a hash key acquired by hashing the call flow information.

13. The service monitoring method of claim 10, further comprising transmitting, by the service apparatus, the second abbreviated key acquired from the one or more first abbreviated keys and a performance measurement result value of each of the one or more functional blocks acquired by measuring a performance of each of the one or more functional blocks based on the performance measuring code to the monitoring server before the profiling information is acquired.

14. The service monitoring method of claim 13, wherein the performance measuring code includes one or more instructions for calculating a difference between an execution start time and an execution end time of the functional block, acquiring a response time of the functional block, and outputting the response time as the performance measurement result value when the functional block is executed.

15. The service monitoring method of claim 13, wherein the acquiring of the profiling information comprises restoring the text information from the second abbreviated key received from the service apparatus by referring to the first table and the second table.

16. The service monitoring method of claim 15, wherein the profiling information includes the text information corresponding to the functional block restored by the monitoring server and the performance measurement result value for the functional block.

\* \* \* \* \*